United States Patent
Schneider et al.

(10) Patent No.: US 6,696,774 B1
(45) Date of Patent: Feb. 24, 2004

(54) MAGNETOHYDRODYNAMIC POWER EXTRACTION AND FLOW CONDITIONING IN A GAS FLOW TURBINE

(76) Inventors: Steven J. Schneider, 19851 Frazier Dr., Rocky River, OH (US) 44116; Isaiah M. Blankson, 5145 Cressmont Ave., Solon, OH (US) 44139

( * ) Notice: Subject to any disclaimer, the term of this patent is extended or adjusted under 35 U.S.C. 154(b) by 217 days.

(21) Appl. No.: 09/872,650

(22) Filed: Jun. 1, 2001

(51) Int. Cl.$^7$ ................................................ G21D 7/02
(52) U.S. Cl. ........................................ 310/11; 250/435
(58) Field of Search ............................ 250/435; 310/11

(56) References Cited

U.S. PATENT DOCUMENTS

| | | | |
|---|---|---|---|
| 1,443,091 A | * 1/1923 | Peterson | 310/11 |
| 2,210,918 A | * 8/1940 | Karlovitz et al. | 310/11 |
| 3,162,398 A | * 12/1964 | Clauser et al. | 244/3.1 |
| 3,634,704 A | * 1/1972 | Stix | 310/11 |
| 3,660,700 A | * 5/1972 | Aisenberg et al. | 310/11 |
| 3,678,306 A | * 7/1972 | Garnier et al. | 310/11 |
| 4,047,381 A | 9/1977 | Smith | 60/226.2 |
| 4,389,227 A | 6/1983 | Hobbs | 55/306 |
| 4,450,361 A | * 5/1984 | Holt | 290/1 R |
| 4,772,816 A | * 9/1988 | Spence | 310/306 |
| 5,387,081 A | 2/1995 | LeBlanc | 415/208.1 |
| 5,603,605 A | 2/1997 | Fonda-Bonardi | 415/211.2 |
| 5,911,679 A | 6/1999 | Farrell | 60/39.183 |
| 6,484,492 B2 | * 11/2002 | Meholic et al. | 60/247 |

* cited by examiner

Primary Examiner—Juanita Stephens
Assistant Examiner—Blaise Mouttet
(74) Attorney, Agent, or Firm—Kent N. Stone

(57) ABSTRACT

This invention provides an apparatus and a method which utilizes magnetohydrodynamic means for conditioning flow in a gas flow turbine or turbojet and for achieving power extraction to increase relative velocity. Moreover, the power, which is so extracted, can be recycled back into the system in order to further increase the power output and efficiency of the engine. The invention achieves the flow conditioning through use of an inlet annular flow passage. This assembly is placed upstream of the gas turbine inlet and has one or more superconducting magnets, which create a high magnetic field operative across the flow passage. Preferably, the magnetic field is a radial field. The walls of the passage include slots, which accommodate electron beams directed in a spiral path within the magnetic field to form locally ionized regions in the form of a helix within the annular flow path. An electrical load is placed across the inlet and the outlet of the annular duct in order to extract power, which can be reintroduced into the energy system in a variety of ways, for example by the softening of shock waves to reduce drag and/or magnetohydrodynamic flow acceleration downstream of the gas flow turbine.

25 Claims, 2 Drawing Sheets

MAGNETOHYDRODYNAMIC POWER EXTRACTION AND FLOW CONDITIONING IN A GAS FLOW TURBINE

ORIGIN OF THE INVENTION

The invention described herein was made by an employee of the United States Government, and may be manufactured and used by or for the Government for governmental purposes without the payment of any royalties thereon or therefore.

FIELD OF THE INVENTION

The present invention relates to an apparatus and method for conditioning flow in a gas flow turbine or turbojet and for achieving power extraction to increase relative vehicle velocity. Moreover, the power which is so extracted can be recycled back into the system in order to further increase the power output and efficiency of the engine. The invention achieves the flow conditioning through use of an inlet annular flow passage which is placed upstream of the engine inlet and having one or more superconducting magnets which create a high radial magnetic field operative across the duct. Electron beams are directed in a spiral path within the magnetic field to form locally ionized regions within the annular flow path. Power can be extracted by placing an electrical load across the inlet and the outlet of the annular duct with a resulting interaction between the flowing current and the magnetic field. The power can be reintroduced into the vehicle energy system in a variety of ways, for example by the reduction of drag.

BACKGROUND OF THE INVENTION

It has been known in the prior art to use various fluid dynamic means to modify flow characteristics at the inlet of a gas flow turbine. For example, U.S. Pat. No. 4,047,381 teaches the use of a flow conduit arrangement within a turbine engine which maintains in a given position with respect to the plane of the air intake, the upstream portion of reversed flow around the turbine or which even destroys the reversed flow altogether. U.S. Pat. No. 4,389,227 illustrates an air intake structure for a gas turbine engine having a mushroom shaped center portion, which along with a step downstream of the apertured wall surrounding the center portion causes liquid droplets to be launched from the center body so as to avoid introduction of the droplets into the air inlet of the engine.

It is also known to use fluid dynamic means to accomplish flow modification by means of diffusion, which typically is induced at the exit portion of the gas turbine compression stage. This process changes the gas turbine flow from low pressure, high velocity to high pressure, low velocity. However, this process does not generally contemplate inducing, let alone utilizing a change in the flow energy. Examples of this technology are represented by U.S. Pat. Nos. 5,387,081; 5,603,605; and 5,911,679.

Both of these kinds of prior art turbine technology rely on changing the architecture of the turbine structure to influence the gas flow characteristics and further both maintain substantially the same flow energy. The present invention represents a significant difference from the prior art, as it utilizes an electromagnetic means of conditioning the flow of a gas turbine or turbojet. Moreover, the invention contemplates extraction of energy from the flow to lower the flow energy into the gas turbine combustor. Lower energy in the flow enables more efficient energy addition in the combustor and can increase the flight Mach Number ("No.") of the engine.

While a highly specialized field of the prior art involves the use of electromagnetic forces imposed on gases such as xenon, and krypton for propulsion in space, these devices have no apparent application with respect gas turbine propulsion in a supersonic system, which operates at a much higher standard operating pressure. Moreover, this prior art relies on a fully ionized gas, whereas the present invention has to supply the means of ionization in the form of an electron beam gun which generates only a weakly ionized gas.

In accordance with the present invention it is novel to use an electron beam within a flow passage subjected to a magnetic field upstream of the gas turbine or turbojet inlet to influence the electromagnetics of the fluid flow, and subsequently to modify the flow at the inlet of a gas turbine. As used herein with reference to the "flow", "fluid" and "gas" are used interchangeably and meant to refer to the medium or propellant, which the engine subjects to a velocity change in order to cause propulsion. In addition, the magnetic field is an annular field, and an electron beam is used in a spiral configuration. Moreover, in accordance with the present invention this modification can be used to extract power which can be reintroduced back into the propulsion system to increase the engine efficiency. This contrasts with prior art techniques of flow modification which did not intentionally modify the turbine flow energy and the turbine power, and which relied solely on structural modification to the flow housing to influence the flow dynamics.

In addition, the present invention can use the extracted energy to boost the overall power of the drive system, for example, by using the energy for drag reduction. However, the invention could be used for other, or broader applications. This redirection of energy or energy by-pass can be used for example, to influence or "soften" the shock waves at the bow of the jet vehicle. Theoretically, the drag to which the vehicle is subjected can be changed by altering the profile of the shock wave at the bow of the vehicle. The consequence is more apparent power to the vehicle, and the ability to achieve higher Mach speeds. The invention can also be used to influence the thermodynamic characteristics of the drive system. If kinetic energy is extracted from the gas turbine or turbojet inlet, then this energy is not available for conversion to thermal energy by a diffusion process thus reducing the temperature that the gas enters the gas combustor and further enabling the addition of more energy into the turbine combustion process before reaching the temperature limitations of the turbine material. The redirected energy can be reintroduced at the turbine outlet in the form of velocity. Thus, the use of magneto hydrodynamic ("MHD") flow conditioning at high speeds permits the addition of energy in the gas turbine combustor without increasing the operating temperature of the engine so as to exceed the physical limitations of the engine structure. Magneto hydrodynamic flow is also referred to as magneto-gasdynamic flow.

One of the objects of the present invention is to lower the gas energy at the engine inlet in order to increase the temperature differential available for energy addition in the gas turbine combustor. This is accomplished by using MHD power extraction to shift the location at which the velocity component of the inlet flow energy is introduced into the system, i.e. from the inlet of the gas turbine to the outlet of the gas turbine and/or this energy could be used to accomplish drag reduction on the vehicle, by softening the shock wave on the vehicle. Other uses of the energy to increase the efficiency of the operating system such as the auxiliary power and magnetohydrodynamic flow acceleration are contemplated as being within the scope of this invention.

A further object of the invention is to use electron beams to influence the fluid flow in a gas turbine by bombarding the atoms and stripping off electrons to generate a partially ionized fluid comprising free ions and charged particles. This enables the charged particles to interact with the electro-magnetic field.

SUMMARY OF THE INVENTION

The invention comprises an inlet annular flow passage without mechanical obstruction or a "duct" member which is placed upstream of, preferably contiguous to, the inlet of a gas turbine engine. As used herein "gas flow turbine engine" contemplates the use of the invention within a gas turbine engine such as used for an airline, or a turbojet as is used for a high-speed aircraft, and similar high-speed flow applications. A superconducting electromagnet is placed around the annular duct such that a high magnetic field, which is preferably radial, is operative across the duct. Around the duct on both the inside and outside walls, small slots are cut in the walls, directly opposite one another, like the threads of a screw. Electron beams are passed through these slots. These electron beams collide with molecules in the inlet duct flow and locally ionize them in an efficient manner. Once ionized, the molecules interact with the magnetic field and act to retard the flow. Power is extracted from this interaction, by placing an electrical load across the inlet and exit of the annular duct. The electrical current flow through the annular duct is along the spiral path of ions in the flow formed by the electron beams. This flow interaction will cause a swirl in the inlet flow, which can be easily accommodated by inlet guide vanes on the gas turbine. While the foregoing represents the preferred embodiment for implementation of the electromagnetic field and power extraction, the invention also encompasses differing configurations, which would include rectilinear inlet geometries with unidirectional B-fields. Additionally, while opposing spiraling electron guns have been described, the path of the guns may have a different shape, or even a single gun may be used.

DETAILED DESCRIPTION OF THE INVENTION

Figure 1:
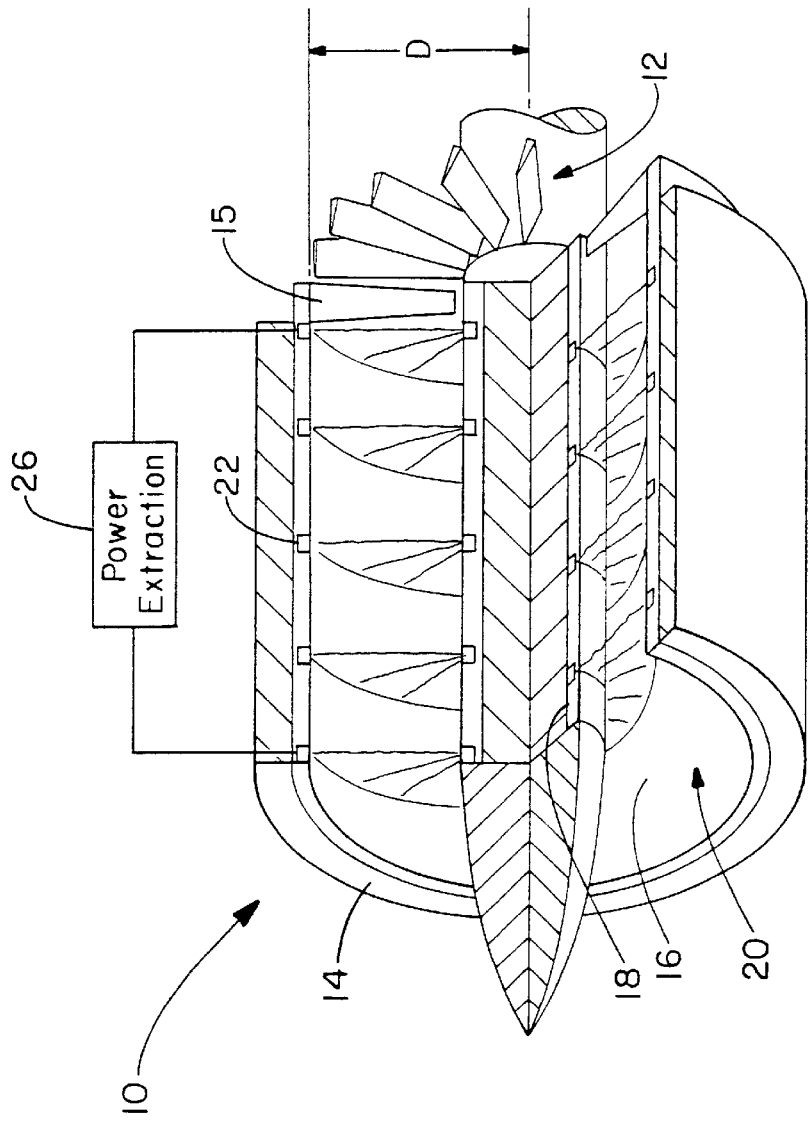
FIG. 1 is a schematic representation of magnetohydrodynamic power extraction device in accordance with the invention.

FIG. 1 illustrates an inlet annular passage assembly 10 which is provided upstream of a gas flow turbine 12. The assembly 10 includes an outer flow conduit 14 and an internal member 15. The outer flow conduit 14 preferably comprises a cylindrical duct having an internal superconducting magnetic member 16 and also includes means to generate an electron beam commonly referred to as an electron beam gun 22. The internal member 15 preferably comprises a cylinder also having an internal super conducting magnetic member 17 and an electron beam gun 18. In combination the duct and the internal member form an unobstructed cylindrical flow passageway 20. The inner diameter of the duct 14 substantially corresponds to the diameter of the flow passage at the inlet of the turbine 12.

The internal and the external walls defining the annular passageway 20, both include opposing slots which direct the electron beams 24 preferably in a spiral path relative to the annular passageway 20. The effect of this configuration is to achieve a flat profile of the electron distribution across space like a electrically enhanced curtain of conductivity that spirals down the flow path similar to an auger, thread or a water screw. This enhanced curtain is the conductor through which current flows and interacts with a radial B-field, i.e., a radial magnetic field.

A power extraction load 26 is put across the length of the annular passage assembly by means of a power extraction device. This device could include electrodes at the inlet and outlet of the flow conditioning assembly which pass a current through the spiral curtain of conductivity in the flow path. The pitch or slope of the electron beam spiral can vary. The thread angle should be from about 0.5 to about 5 degrees, and preferably about three degrees. The lower the angle, the more turns that would be achieved. Theoretically, the tighter the turns the higher the energy extraction that would be available.

The interaction of the magnetic field and the current in the spiral curtain of conductivity, results in a retardation of the flow and in power extraction by the power extraction circuit. The current has a tangential Jtheta and a axial Jz component. Jtheta times B represents a force which retards the axial velocity. Jz×B causes a swirl in the flow.

The MHD device of the present invention can be used with any standard turbine in order to increase the flight mach number range of the vehicle.

The invention resides in the apparatus using spiral electron beam pathways (i.e. a helical curtain of electrons in the form of a helix) to induce conductivity in the gas flow, and subsequently to subject this to a magnetic field to condition the flow in a gas turbine. It is also novel to use this method to extract power and utilize it elsewhere in the system to increase the total power and engine efficiency.

The electrical load can be tailored in order to vary the power which is extracted from the inlet flow. Thus, the method allows for a variable power extraction without requiring a variable inlet geometry. If the circuit is open the e-beam guns can still run without substantially affecting the flow energy. However the load can be varied to vary the amount of energy that is extracted without requiring the apparatus geometry to be changed.

Figure 2:
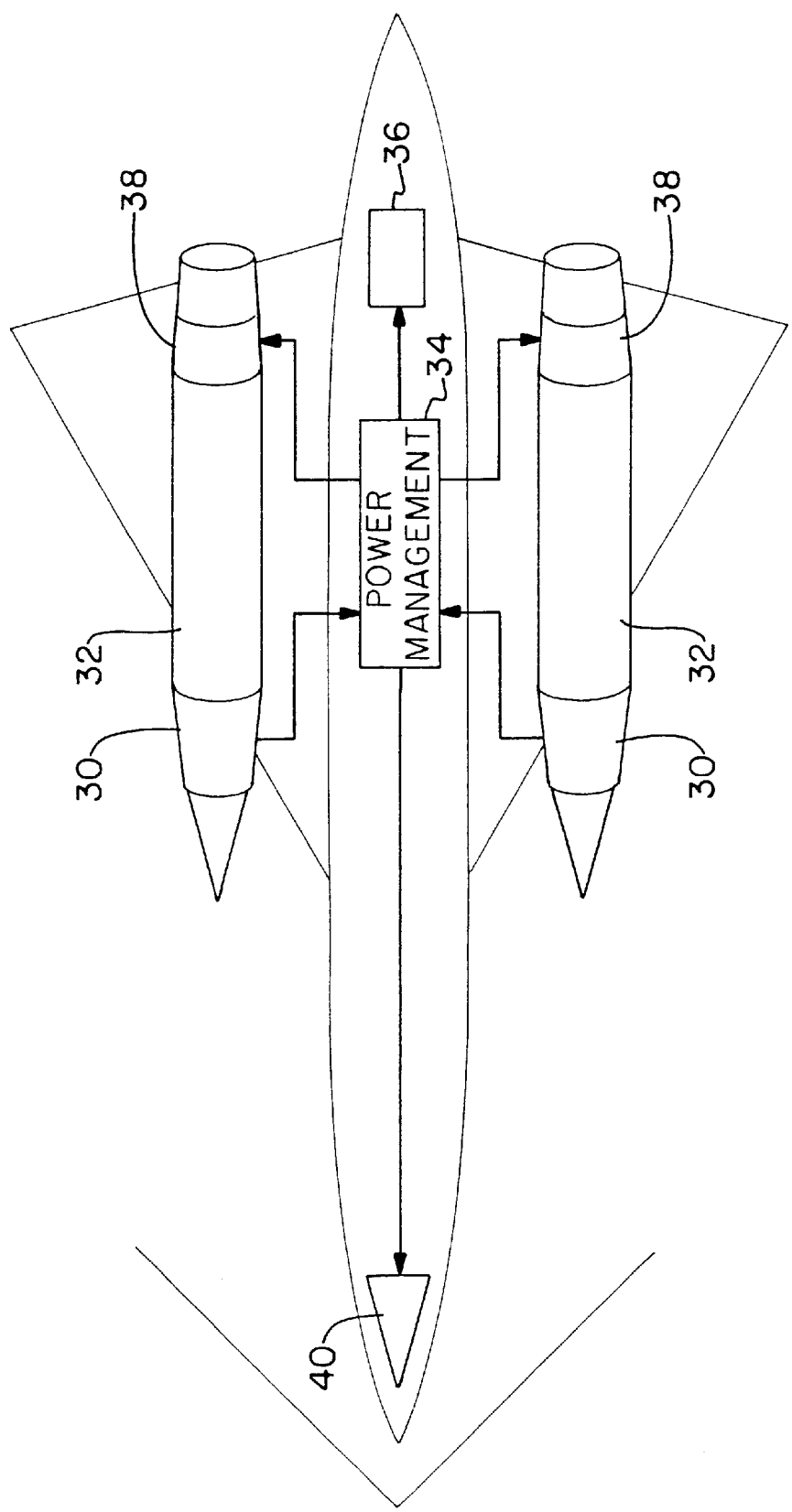
FIG. 2 is a schematic of the power management system.

As shown in FIG. 2, the length of the extraction device 30 corresponds roughly to the diameter of the engine turbine 32, or is slightly smaller. For example, if the diameter of the turbine is around three feet, then the length of the extraction device is around 2–3 feet, preferably 2.5 feet assuming about a three-degree spiral that results in five winds. The inner diameter of the outer magnet plus the electron curtain generator corresponds to the outer diameter of the turbine flow path. The outer diameter of the inner magnet plus the electron curtain generator is close to the hub diameter of the turbine inlet. Suitable electron beam generators include those available from Kimball Physics, Inc, of Wilton, N.H. The magnets used in the extraction device are superconducting, lightweight magnets used for aircraft construction. A cryogenic fluid is used in order to provide for cooling of the magnet. The gas turbine inlet guide vanes typically comprise ferrous super alloys and are a standard configuration for flow straightening. A device 34 can be used for power management so as to reroute power extracted using the MHD extraction device 30 to an auxiliary power unit 36. MHD accelerators 38 can be used subsequent to the turbine engine or turbojet. An ionized gas generator 40 could also be subjected to the power management device 34. The power extraction electronics varies the amount of current, which will flow as a function of the impedance of the power extraction circuit. The impedance can be optimized to extract a optimum amount of power or to extract something less than that.

The power extraction device in accordance with the present invention mounts to the inlet of the turbine and will add about 2.5 feet length. It is envisioned that it will be used at very high altitudes and high speeds. Another point of novelty of the invention is that it enables a turbine to be used in its customary configuration at low altitudes and/or low speeds. Thus, in particular for take-off and landing the device doesn't need to be used to add power back in to the drive system. Use of the device can be limited to flight regimes where the temperature limitation of the turbine is reached. At this point, the device can be activated, and operation can be continued at a higher mach number.

While in accordance with the patent statutes the best mode and preferred embodiment have been set forth, the scope of the invention is not limited thereto, but rather by the scope of the attached claims.

What is claimed is:

1. An apparatus for conditioning flow in a gas flow turbine vehicle engine comprising:
    a gas flow turbine engine having an engine inlet,
    an annular shaped inlet flow passage having a inner wall and outer wall and being located upstream relative to the gas flow of the engine inlet and including a magnet to create a magnetic field operative across the flow passage, and
    at least one electron beam generator which includes one or more slots that define a spiral on one or both of the inner wall and the outer wall through which electron beams pass to form a locally ionized auger-shaped region within the flow passage.

2. A flow conditioning flow apparatus as set forth in claim 1, wherein said magnet comprises a superconducting magnet.

3. A flow conditioning flow apparatus as set forth in claim 2, wherein said magnetic field is a radial field.

4. A flow conditioning flow apparatus as set forth in claim 3, further comprising a power extraction device.

5. A flow conditioning flow apparatus as set forth in claim 4, wherein said power extraction device comprises an electrical load placed across the inlet and outlet of the flow passage which is used to extract power.

6. A flow conditioning flow apparatus as set forth in claim 5, wherein said extracted power is used for the reduction of drag of said vehicle.

7. A method of conditioning flow upstream of the inlet of a gas flow turbine vehicle engine comprising the use of a magnetic flow interaction in a non-conducting fluid rendered conductive by electromagnetic means and thereby to modify the flow characteristics of the fluid, said magnetic flow interaction taking place within an annular flow passage having a cylindrical inner wall and a cylindrical outer wall together defining a flow path, and including one or more magnets to create a magnetic field operative across the flow passage and at least one electron beam generator directed within said magnetic field which passes one or more electron beams through one or more slots which define a spiral in the inner wall or the outer wall to form a locally ionized regions that spirals down the flow path.

8. A method as set forth in claim 7, wherein said annular flow passage includes an inlet and an outlet and wherein an electrical load is placed across the inlet and outlet of the annular flow path to extract power.

9. A method as set forth in claim 8, wherein said electrical load is used to extract power and recycle it to drive a jet aircraft powered by said gas turbine.

10. A method as set forth in claim 9, wherein said extracted power is used for the reduction of drag of said vehicle.

11. A method as set forth in claim 7, wherein said magnet comprises a superconducting magnet.

12. A method as set forth in claim 11, wherein said magnetic field is a radial field.

13. A method as set forth in claim 12, further comprising a power extraction device.

14. An aircraft engine for high altitude flight comprising:
    a gas flow turbine engine having an engine inlet,
    an annular flow passage having an inner cylindrical wall and an outer cylindrical wall and being located upstream relative to the gas flow of the engine inlet and including a superconducting magnet to create a radial magnetic field operative across the flow passage, and
    at least one electron beam generator including one or more slots which form a spiral in either or both of the inner and the outer wall through which one or more electron beams is passed to form a locally ionized region within the flow passage.

15. An aircraft engine as set forth in claim 14, wherein said magnetic field is a radial field.

16. An aircraft engine as set forth in claim 15, further comprising a power extraction device.

17. An aircraft engine as set forth in claim 16, wherein said power extraction device comprises an electrical load placed across the inlet and outlet of the flow passage.

18. An aircraft engine as set forth in claim 17, wherein said electrical load is used to extract power and recycle it to drive an aircraft powered by said aircraft engine.

19. An aircraft engine as set forth in claim 18, wherein said electrical load is used to influence the thermodynamic characteristics of the drive system of the aircraft.

20. A method of increasing the operating speed of an aircraft having a gas combustion engine which comprises conditioning the flow within the gas combustor of the engine and using an electromagnetic flow interaction in a non-conducting fluid to render it conductive and thereby to modify the flow characteristics of the fluid, said electromagnetic flow interaction taking place within an annular flow passage having and inner wall and an outer wall and an inlet and an outlet and defining a flow path, and including one or more superconducting magnets to create a radial magnetic field operative across the flow passage and locally ionized regions which comprise a flat profile of electron distribution that extends radially from the inner wall to the outer wall and that spirals down the flow passage.

21. A method as set forth in claim 20, wherein at least two electron beam generators are used in opposition to each other across the flow passage to form the electron distribution.

22. A method of increasing the operating speed of an aircraft engine as set forth in claim 20, further comprising a power extraction device comprising an electrical load placed across the inlet and the outlet of the flow passage wherein the electrical load is used to extract kinetic energy to reduce the temperature that gas enters the combustor.

23. A method of increasing the operating speed of an aircraft as set forth in claim 20, further comprising softening the shock wave on the aircraft.

24. A device for conditioning flow in a gas flow turbine vehicle engine comprising:

a gas flow turbine engine having an engine inlet, an annular inlet flow passage having an inner wall and an outer wall and located upstream of the engine inlet relative to the gas flow and including a magnet to create a magnetic field operative across the flow passage; and locally ionized regions which comprise a flat profile of electron distribution that extends radially from the inner wall to the outer wall and that spirals down the flow passage.

25. An aircraft engine for high altitude flight comprising:

a gas flow turbine engine having an engine inlet, an annular inlet flow passage having an inner wall and an outer wall and located upstream relative to the gas flow of the engine inlet and including a superconducting magnet to create a radial magnetic field operative across the flow passage; and locally ionized regions which comprise a flat profile of electron distribution that extends radially from the inner wall to the outer wall and that spirals down the flow passage.

* * * * *